United States Patent [19]

Fahmie

[11] 4,065,195
[45] Dec. 27, 1977

[54] COLLAPSIBLE DOG FEEDER

[76] Inventor: John H. Fahmie, 8805 Bird Road, Miami, Fla. 33156

[21] Appl. No.: 685,702

[22] Filed: May 12, 1976

[51] Int. Cl.$^2$ .................... A47B 43/00; A47B 48/00
[52] U.S. Cl. .................................................. 312/258
[58] Field of Search .................. 312/258, 140.2, 262, 312/263, 264, 265

[56] References Cited

U.S. PATENT DOCUMENTS

| 309,992 | 12/1884 | Stone | 312/258 |
|---|---|---|---|
| 835,902 | 11/1906 | Damato | 312/262 |
| 922,181 | 5/1909 | Ohlson | 312/258 |
| 1,642,687 | 9/1927 | Morris | 312/258 |
| 1,889,760 | 12/1932 | Peters | 312/258 |
| 1,917,629 | 7/1933 | Anderson | 312/258 |
| 2,515,876 | 7/1950 | Kauffman | 312/258 |
| 3,009,752 | 11/1961 | Margulis | 312/258 |
| 3,208,807 | 9/1965 | Becker | 312/140.2 |
| 3,562,929 | 2/1971 | Emore, Jr. | 312/262 |
| 3,975,069 | 8/1976 | DeLucia | 312/258 |

Primary Examiner—Paul R. Gilliam
Assistant Examiner—Victor N. Sakran

[57] ABSTRACT

A collapsible dog feeder which is composed of three hingedly interconnected support panels, a front panel and a pair of spaced side support panels, and a top panel to be supported by the support panels which is hingedly connected to the front support panel and which spans the side support panels when the dog feeder is erected; and, when the dog feeder is in a collapsed condition, the side panels are hingedly moved into coplanar relation with one another and in a plane parallel to the front panel and the top panel is hingedly moved about its hinge axis into a plane parallel to the support panels. A handle is provided on the feeder for carrying it when in a collapsed condition.

3 Claims, 6 Drawing Figures

COLLAPSIBLE DOG FEEDER

FIELD OF THE INVENTION

This invention relates to animal feeders and, more particularly, to an animal feeder for large dogs.

BACKGROUND OF THE INVENTION

As is generally known in the art, large dogs, such as German shepherds and Dobermans, are quite tall relative to other dogs. This requires that, while feeding, such dogs bend their necks downwardly to a feeding tray placed on the ground. Over a period of time, while the dogs are growing, this interferes with their appearance and lines generally. For this reason, it is best that such large dogs feed from trays which are elevated from the ground, so that they do not have to bend their necks to the ground while feeding.

This invention is of a feeder which provides a support surface for feeding trays which is elevated from the ground surface, with the top surface of the feeder being supported by side and front support panels or legs. Further, the side panels, front panel, and top panel are hingedly connected together for collapsibility when not in use so that it can be easily carried and stored. This is an importnat feature since, often times people concerned most with the appearance and lines of a dog, travel with their dogs to show them at dog shows where they must be fed.

OBJECTS OF THE INVENTION

It is, accordingly, an object of this invention to provide a portable, collapsible feeder stand with a support surface for feeder trays which is elevated above a ground surface and which has support legs which are collapsible and which may be easily transported when in a collapsed condition and which can be readily set up as a feeder tray support.

It is also a general object of this invention to provide an improved animal feeder for large dogs which includes a collapsible plurality of support panels and a supported panel which are interconnected by hinge means so that feeding trays may be positioned on the supported panel while feeding, and, when not in use, the panels of which are adapted to be collapsed or hingedly moved into a compact suitcase type configuration for ease of transportation and storage.

In accordance with these and other objects which will become apparent hereinafter, the invention will now be described with reference to the accompanying drawings illustrating a preferred embodiment which may be of suitable, rigid material, such as wood, plastic or other relatively lightweight material.

Figure 1:
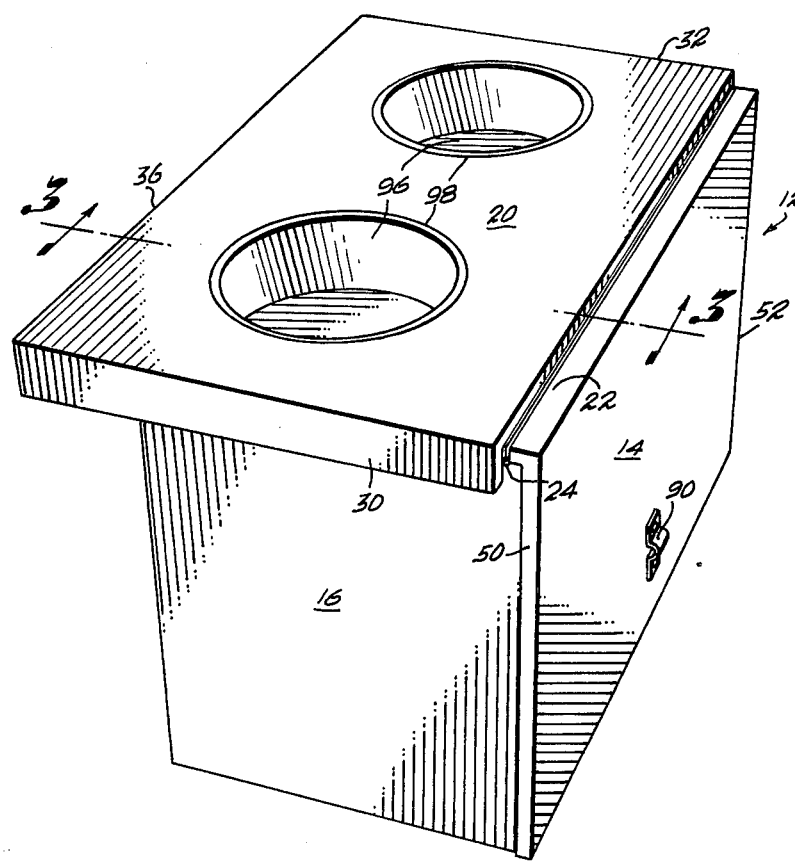
FIG. 1 is a perspective view of an animal feeder of the type set forth hereinafter.
Figure 2:
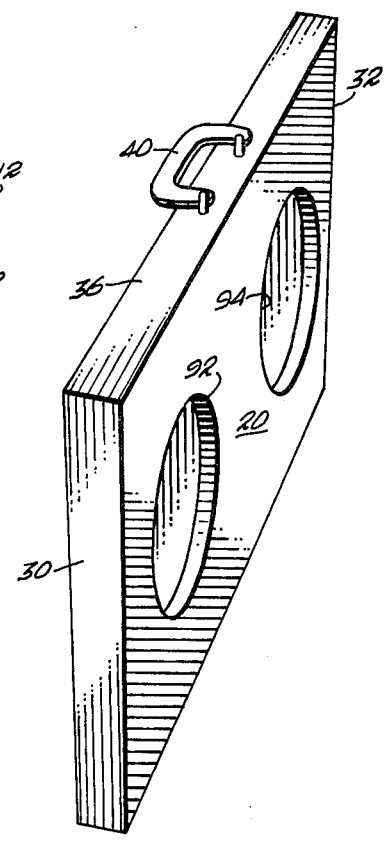
FIG. 2 is a view of the animal feeder of FIG. 1 in a collapsed condition.
Figure 3:
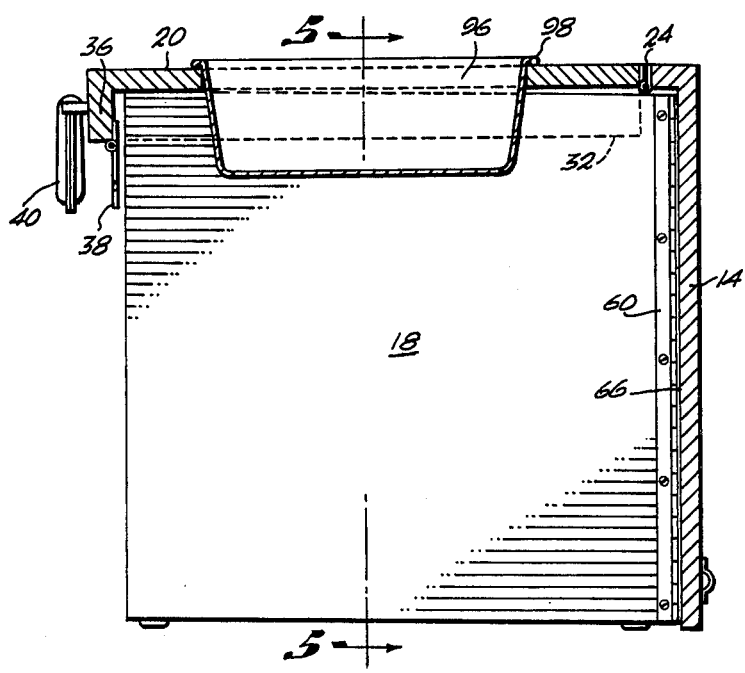
FIG. 3 is a view in cross section taken on the plane indicated by the line 3—3 of FIG. 1 and looking in the direction of the arrows.
Figure 4:
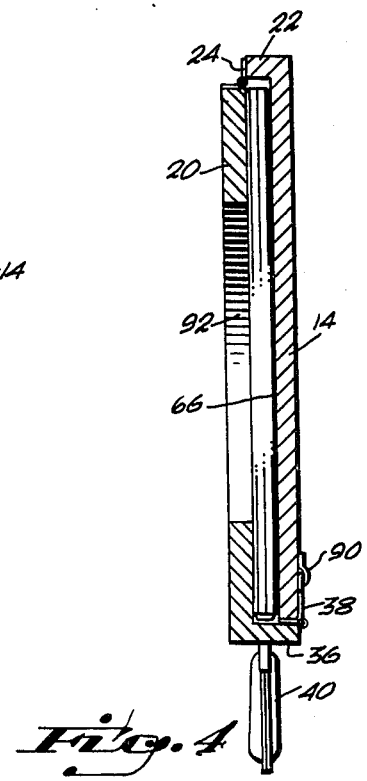
FIG. 4 is a view of the device shown in FIG. 3 in a collapsed condition.
Figure 5:
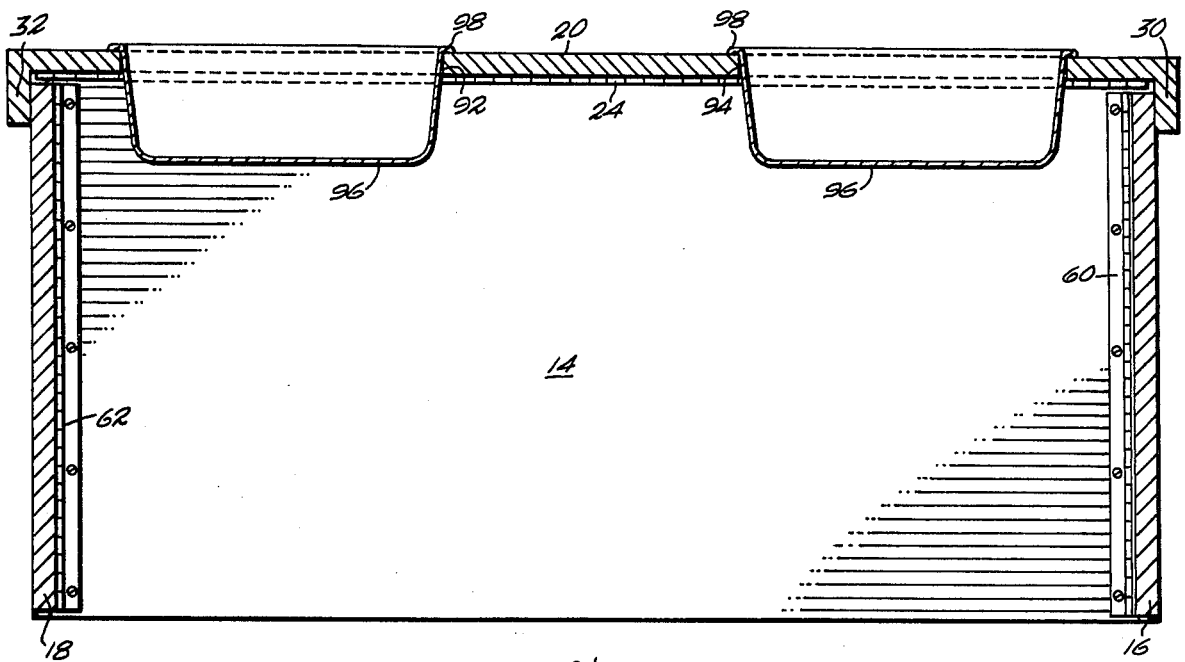
FIG. 5 is a view taken on the plane indicated by the line 5—5 of FIG. 3 and looking in the direction of the arrows.
Figure 6:
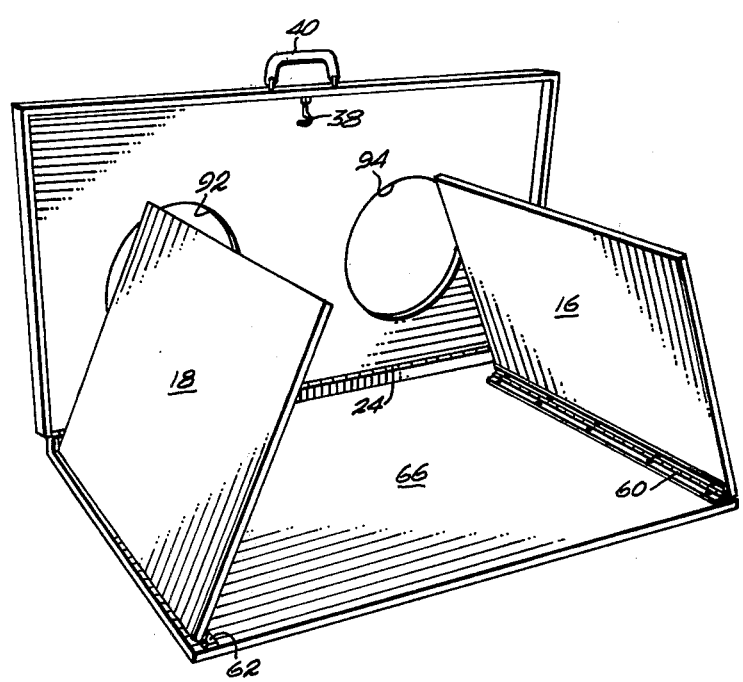
FIG. 6 is a view illustrating the operation of the instant invention.

DESCRIPTION OF PREFERRED EMBODIMENT:

Referring to the drawings wherein like reference characters designate like or corresponding parts throughout the several views, there is shown an animal feeder generally designated by the numeral 12 which is composed of a front panel 14, side support panels 16 and 18 and a top panel 20, which are hingedly connected together. The front panel includes a top lip along the upper edge, which lip is designated by the numeral 22. To the edge surface of the lip, a longitudinally-extending piano hinge 24 is provided which connects to a confronting edge surface of the top panel 20. The top panel 20 has downwardly-extending peripheral flanges 30, 32 and 36 defining a skirt. A keeper means 38 and a carrying handle 40 are provided on the front flange 36. The front panel is of a dimension between the side edges 50 and 52 which is sized to nest within the skirt defined by th downwardly-extending flanges 30, 32 and 36 of the top panel when in a folded condition, see FIG. 2. As seen best in FIG. 6, from the front panel, side panels or support panels designated by the numeral 16 and 18 extend; these side panels are hingedly connected as at 60 and 62 respectively to the interior surface 66 of the front panel. Each side panel is of a length such that it is adapted to fold into co-planar relationship with one another as indicated in FIGS. 6 and FIG. 4 between the front and top panel when the animal feeder is collapsed. A hook means, that is the keeper 38, is adapted to connect to a loop means 90 on the front panel. Holes 92 and 94 are preferably provided in the top panel and are sized to receive therein pans such as that indicated by the numeral 96 in FIG. 3 which have a lip 98 which bears or supports the feeding tray.

What is claimed is:

1. A portable animal feeder stand comprising:
   a front panel of rigid material having opposed side edges and an upper edge and a lower edge and having an inner face and an outer face extending between the edges,
   a pair of side panels of rigid material and of similar size to one another, each having opposed side edges and a top edge and a bottom edge,
   hinge means connecting one edge of one of said pair of panels to the inner face of the front panel and hinge means connecting the other of said pair of panels to the inner face of the front panel, each of said hinge means being adjacent and parallel to one of the side edges of said front panel, and the bottom edge of each side panels being at the plane of the bottom edge of said front panel and the top edge of each of said side panels being spaced from the top edge of said front panel on said inner face, a common distance with their top edges defining a support surface,
   the distance between the side edges of each panel being not greater than one-half the distance between the side edges of the front panel for overlaying the front panel when collapsed,
   the top edge of said front panel having a lip extending from the inner face of a predetermined dimension, and
   a top panel having an inner surface an an outer surface, a front edge, a rear edge and side edges and said side edges being spaced from one another a distance slightly greater than the distance between the side edge of said front panel and the distance between said front and rear edge of said top panel being spaced from one another a distance greater than the distance between the top and bottom edges of said side panel, hinge means connecting the front edge of the top panel to the front panel, and means to connect the panels together when the side panels are hingedly moved into a common plane parallel to the plane of the front panel and the top panel is moved into a plane parallel to said side panels and front panel, said recessed are provided in the top panel sized to receive feeding parts, said top panel includes flanges extending from the inner surface on the side and rear edges defining a three-sided skirt and said front panel having a flange along the top edge extending away from said inner face, said flanges defining a receptacle for said side panels when said panels are hingedly moved into coplanar relation overlaying said inner face of said front panel and said top panel is hingedly moved into parallel alignment with said front panel.

2. The device as set forth in claim 1 wherein said means comprises hook means carried on the front panel and the top panel.

3. The device as set forth in claim 1 wherein the flange extending from the inner surface of the rear edge of the top panel has an inner surface and an outside surface and carrying means are provided on said outside surface.

* * * * *